United States Patent Office 2,823,186
Patented Feb. 11, 1958

2,823,186

SILICA AQUASOL CONTAINING A POLYHYDRIC ALCOHOL

Ralph F. Nickerson, Marblehead, Mass., assignor to Monsanto Chemical Company, St. Louis, Mo., a corporation of Delaware No Drawing. Application September 14, 1955
Serial No. 534,402

10 Claims. (Cl. 252—313)

The present invention relates to improved silica sols, particularly improved silica sols which contain organic substances.

Heretofore various silica sols have been prepared which contain varying amounts of water-soluble polyhydric alcohols as, for example, glycerol and diethylene glycol. The amount of such polyhydric alcohol employed varied depending upon the purpose for which the sol was used. In those instances where the polyhydric alcohol was employed to lower the freezing point of the silica sol, the amount employed was about 4 to 20% of the weight of a stable, alkaline silica aquasol. However, such silica sols darkened in color on storage and also developed an undesirable odor (much like a sewage odor). Moreover, a scum, which would vary in color but was usually brown, developed on the surface of the silica sol especially after relatively long periods of storage and at slightly elevated storage temperatures. Such silica sols were not considered acceptable by the trade. The exact cause of this undesirable change in the silica sol is not known but has been attributed to microorganisms of some kind such as anaerobic bacteria. Various additives having biocidal activity have been tried to prevent or inhibit the darkening in color and the development of odor and scum in the silica sols, but none of these has been entirely successful. Some are fairly successful in the sense of producing the desired effect, but impair the properties of the silica sols for various end uses, while others do not consistently inhibit or prevent the undesirable changes in the silica sols.

It is, accordingly, one object of this invention to provide novel silica sols containing a polyhydric alcohol, which silica sols have desirable properties for a large variety of end uses and do not develop a dark color or undesirable odor or scum during storage.

It is a further object of this invention to provide novel, stable, alkaline silica aquasols containing a polyhydric alcohol in an amount sufficient to materially lower the freezing point of such aquasol, which aquasol has utility for a wide variety of purposes and does not darken in color or develop an undesirable odor and/or scum during storage.

Other objects and advantages of this invention will be apparent from the following description and appended claims.

It has presently been found that the incorporation of sodium pentachlorophenate, in relatively small amounts, in a stable, alkaline silica aquasol having dissolved therein an amount of a water-soluble polyhydric alcohol sufficient to appreciably lower the freezing point of such aquasol provides a composition which does not darken or develop undesirable odors or scum even when stored for long periods, for example, from 2 to 18 months at elevated temperatures of 30 to 60° C. In contrast, a composition of like nature, but not containing the sodium pentachlorophenate will normally darken and/or develop undesirable odor and scum under identical storage conditions, especially when stored in the absence of light.

The stable, alkaline silica aquasol employed is characterized in that it contains from 5 to 45% by weight, preferably from 15 to 40% by weight of colloidal silica having an ultimate particle size of about 10 to 20 millimicrons, such silica particles consisting of average particles measuring between about 20 and 400 millimicrons, which average particles are agglomerates of the ultimate particles. These aquasols are further characterized in that they have a pH between about 7.5 and 11, preferably a pH between 8.5 and 10.5, usually due to the presence of a monovalent base such as NaOH or $NH_4OH$, and contain less than 1.5% by weight (usually from 0 to 1.3% by weight) of an inorganic salt and have an $SiO_2$ to $M_2O$ ratio in excess of 10:1, and usually between 40:1 and 200:1, where M is a monovalent cation such as $Na^+$ or $NH_4^+$.

Stable, alkaline silica aquasols having the above characteristics can be prepared by the procedures described in U. S. Patent No. 2,375,738 to John F. White, granted May 8, 1945; U. S. Patent No. 2,515,949 to Vincent DiMaio, granted July 18, 1950; U. S. Patent No. 2,572,578 to Henry S. Trail, granted October 23, 1951; and U. S. Patent No. 2,244,325 to Paul G. Bird, granted June 3, 1951, provided, however, that the sol produced according to the last mentioned patent should be subjected to a heat treatment at a temperature of 100° C. or higher in the presence of a small amount of an alkali. The stable alkaline silica aquasol is also characterized by the fact that it is stable to gelation for a period of at least 2 months at temperatures of 15–25° C.

A preferred stable, alkaline silica aquasol for the purposes of this invention may be prepared, in general, by heating a substantially neutral silica aquagel which is substantially free of salts or electrolytes, with a heat stable, alkaline silica aquasol containing a free basic compound in an amount sufficient to convert said aquagel to aquasol, at temperatures above 125° C. in a closed autoclave, under such conditions that boiling or ebullition is substantially prevented. After substantially all of the silica aquagel is thus converted to silica aquasol, the heating is discontinued and silica aquasol is removed from the autoclave. The resulting sol can be concentrated by evaporation of water therefrom, if this is desirable or necessary. The foregoing process is described in greater detail in Example 1, which appears hereinafter, and in the Trail patent referred to above.

As mentioned above, the stable, alkaline silica aquasols employed herein contain less than 1.5% by weight of an inorganic salt. The presence or absence of an inorganic salt is not of importance insofar as the property of the aquasol containing the polyhydric alcohol to darken in color and/or develop an undesirable odor or scum during storage in the absence of sodium pentachlorophenate is concerned. However, the presence of sodium sulfate in such aquasol ordinarily increases the rate of darkening and/or odor or scum formation in the absence of sodium pentachlorophenate. The use of sodium pentachlorophenate successfully prevents or inhibits the darkening of the silica aquasol containing the polyhydric alcohol even in those instances where the silica aquasol contains sodium sulfate.

As examples of water-soluble polyhydric alcohols which can be employed to lower the freezing point of the silica aquasols may be mentioned the water-soluble aliphatic polyhydric alcohols such as ethylene glycol, diethylene glycol, propylene glycol, glycerine, dipropylene glycol, sorbitol, mannitol and the like. The preferred polyhydric alcohol is ethylene glycol since it is the most efficient polyhydric alcohol for this purpose on a weight basis. The amount of polyhydric alcohol employed should be sufficient to lower the freezing point of the aquasol to 20° F., preferably to 15° F. or lower, but should not exceed about 30% by weight of the silica aquasol. For most purposes an amount of polyhydric alcohol of about 3 to 30% by weight based on the aquasol is suitable, but it is preferred to employ from about 3.5 to 12% by weight of the polyhydric alcohol for most end uses of the aquasol.

The polyhydric alcohol may be incorporated in the silica aquasol in various ways, but it is usually preferred to add the polyhydric alcohol to the silica aquasol after the silica aquasol has been prepared and brought to the desired silica concentration, if the latter step is necessary.

Usually only small amounts of sodium pentachlorophenate are necessary to provide a silica sol having the desired properties, that is, freedom from darkening and/or undesirable odors or scum, during storage. The amounts employed will vary to some extent depending upon the amount of polyhydric alcohol present, the storage conditions and whether the aquasol is or has come in contact with a contaminated batch. In general, an amount of at least 0.005% by weight of sodium pentachlorophenate, based on the weight of the silica aquasol and polyhydric alcohol, gives satisfactory results, but it is preferred to use from about 0.01 to 0.1% by weight of the sodium pentachlorophenate. Larger amounts of the sodium pentachlorophenate may be used, for example, 1% by weight but amounts in excess of 1% offer no advantage, and occasionally cause some difficulties, particularly in the end use of the sol.

The sodium pentachlorophenate may be incorporated in the silica sols in various ways. For example, the material, which is a solid, may be added directly to the aquasol and dissolved therein. This necessitates stirring the aquasol otherwise high localized concentrations of the compound cause some precipitation of silica. It is preferred to dissolve the sodium pentachlorophenate in water to form a water solution and then add such solution to the aquasol. In such instances mixing is not required. In following the latter procedure the sodium pentachlorophenate solution is preferably made as concentrated as possible, for example at a 10% or higher concentration, to avoid excessive dilution of the aquasol.

A further understanding of the compositions and processes of this invention will be obtained from the following specific examples which are intended to illustrate the invention, but not to limit the scope thereof, parts and percentages being by weight unless otherwise specified.

*Example 1*

A stable alkaline silica aquasol was first prepared as follows:

One thousand and one hundred parts of a heat stable alkaline silica aquasol containing 15% of $SiO_2$, less than 0.6% of NaCl and 0.075% NaOH was adjusted to a pH of 10.5 (glass electrode) by the addition of a 10% sodium silicate solution, and charged to a steam jacketed autoclave. Two thousand one hundred and eighty parts of a substantially neutral and substantially electrolyte-free silica aquagel (prepared by reacting aqueous HCl and aqueous sodium silicate at pH 4, allowing to gel, synerizing, crushing to one-inch lumps and then washing with water) and containing 12% of $SiO_2$ were charged to the autoclave. The autoclave employed was substantially filled with the above charge of aquasol and aquagel. The autoclave jacket was heated with steam at a temperature of 198° C., and the interior of the autoclave, above the batch, was subjected to steam at 200 pounds per square inch (gauge) pressure. The autoclave was heated for a period of 1¼ hours, after which the batch was cooled and drained from the autoclave. The resulting silica aquasol had a pH of about 9.5 (glass electrode). This sol was concentrated by evaporation until it contained 15% $SiO_2$.

A silica dispersion was prepared by adding to the above aquasol an amount of ethylene glycol sufficient to provide 4% of ethylene glycol based on the silica aquasol. The resulting dispersion or sol (which is hereinafter referred to as Dispersion A) had a freezing point of 10° F., and could be cooled to −15° F. to provide a frozen product which could be thawed to form a sol substantially identical with the sol which was subjected to freezing.

A 10% solution of sodium pentachlorophenate in water was added to a portion of Dispersion A (referred to in the preceding paragraph) in an amount sufficient to provide a 0.01% of sodium pentachlorophenate, based on the portion of Dispersion A. The resulting dispersion, which is hereinafter referred to as Dispersion B, had substantially the same freezing point as Dispersion A.

Dispersions A and B were inoculated with 0.4% of a dispersion (similar to Dispersion A) which had darkened in color and developed an undesirable odor and scum in storage due to bacterial action. The resulting dispersions were incubated for 8 weeks at 90° F. to accelerate the growth of organisms. At the end of 4 weeks, Dispersion A had darkened in color and had developed a sewage type odor and a brownish scum had formed on the surface thereof. This rendered Dispersion A unsuitable for commercial use. On the other hand, Dispersion B showed no signs of darkening or of developing an undesirable odor or scum after the 8 week incubation period.

*Example 2*

A silica dispersion was prepared by concentrating a silica aquasol prepared according to the procedure of the first paragraph of Example 1 to a silica content of 30% by evaporation, and adding to the concentrated sol an amount of ethylene glycol sufficient to provide 8% ethylene glycol based on the silica aquasol. This dispersion or sol (which is referred to hereinafter as Dispersion C) had a freezing point of −20° F. At lower temperatures the product was frozen but could be thawed to form a stable dispersion.

A 10% solution of sodium pentachlorophenate in water was added to a portion of Dispersion C (referred to in the preceding paragraph) in an amount sufficient to provide 0.01% of sodium pentachlorophenate, based on the portion of Dispersion C. The resulting dispersion, which is hereinafter referred to as Dispersion D, had substantially the same freezing point as Dispersion C.

Dispersions C and D were inoculated and incubated using the procedures and conditions described in the last paragraph of Example 1. Dispersion C changed in the same manner as Dispersion A of Example 1, while Dispersion D did not develop any color or undesirable odor or scum.

The silica sols or dispersions of the present invention may be used in the same manner as the stable, alkaline silica aquasols, that is, for the treatment of a freshly printed paper according to U. S. Patent No. 2,673,520 to John Bainbridge, granted March 30, 1954, and for the treatment of textiles as described in U. S. Patent No. 2,696,444 to Elmer H. Rossin, granted December 7, 1954, or U. S. Patent No. 2,443,512 to Donald H. Powers and William J. Harrison, granted June 15, 1948.

What is claimed is:

1. A composition of matter consisting essentially of a stable, alkaline silica aquasol having dissolved therein from about 3 to 30% by weight of a water-soluble polyhydric alcohol, based on said aquasol, and from 0.005 to 1% by weight of sodium pentachlorophenate, based on said aquasol and polyhydric alcohol.

2. A composition of matter consisting essentially of a stable, alkaline silica aquasol containing from about 5 to 45% by weight of colloidal silica and having dissolved therein from about 3 to 30% by weight of a water-soluble polyhydric alcohol, based on said aquasol, and from 0.005 to 1% by weight of sodium pentachlorophenate, based on said aquasol and polyhydric alcohol.

3. A composition as in claim 2, but further characterized in that said alcohol is ethylene glycol.

4. A composition as in claim 2, but further characterized in that said alcohol is diethylene glycol.

5. A composition as in claim 2, but further characterized in that said alcohol is glycerol.

6. A composition as in claim 2, but further characterized in that said alcohol is propylene glycol.

7. A composition of matter consisting essentially of (1) a stable, alkaline silica aquasol having a pH of 8.5 to 10.5, an $SiO_2$ content of 15 to 40% by weight and an inorganic salt content of less than 1.5% by weight, (2) a water-soluble aliphatic polyhydric alcohol dissolved in said aquasol in an amount of 3.5 to 12% by weight, based on said aquasol, and (3) sodium pentachlorophenate in an amount of from about 0.01 to 0.1% by weight based on said aquasol and polyhydric alcohol.

8. A composition as in claim 7, but further characterized in that said alcohol is ethylene glycol.

9. A composition of matter consisting essentially of (1) a stable, alkaline silica aquasol having a pH of 8.5 to 10.5, an $SiO_2$ content of 15 to 40% by weight and a sodium sulfate content of less than 1.5% by weight, (2) a water-soluble aliphatic polyhydric alcohol dissolved in said aquasol in an amount of 3.5 to 12% by weight, based on said aquasol, and (3) sodium pentachlorophenate in an amount of from about 0.01 to 0.1% by weight, based on said aquasol and polyhydric alcohol.

10. A composition as in claim 9, but further characterized in that the polyhydric alcohol is ethylene glycol.

References Cited in the file of this patent

UNITED STATES PATENTS

| | | |
|---|---|---|
| 2,258,184 | Keenoy | Oct. 7, 1941 |
| 2,515,949 | DiMaio | July 18, 1950 |
| 2,534,030 | Keller | Dec. 12, 1950 |
| 2,635,056 | Powers | Apr. 14, 1953 |

OTHER REFERENCES

Condensed Chemical Dictionary, Turner, 4th ed. (1950), pages 231, 276–7, 321, 548–9, and 610.